US012608906B2

(12) United States Patent
Guo

(10) Patent No.: US 12,608,906 B2
(45) Date of Patent: Apr. 21, 2026

(54) PLANE ESTIMATION METHODS AND APPARATUS, ELECTRONIC DEVICES, AND STORAGE MEDIA

(71) Applicant: Beijing Zitiao Network Technology Co., Ltd., Beijing (CN)

(72) Inventor: Hengkai Guo, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 305 days.

(21) Appl. No.: 18/572,844

(22) PCT Filed: Jun. 17, 2022

(86) PCT No.: PCT/CN2022/099337
§ 371 (c)(1),
(2) Date: Dec. 21, 2023

(87) PCT Pub. No.: WO2023/284479
PCT Pub. Date: Jan. 19, 2023

(65) Prior Publication Data
US 2024/0296651 A1      Sep. 5, 2024

(30) Foreign Application Priority Data
Jul. 12, 2021    (CN) .......................... 202110784263.6

(51) Int. Cl.
*G06V 10/44* (2022.01)
*G06T 7/73* (2017.01)

(52) U.S. Cl.
CPC ................ *G06V 10/44* (2022.01); *G06T 7/73* (2017.01)

(58) Field of Classification Search
CPC ........ G06V 10/44; G06V 10/74; G06V 10/75; G06V 10/757; G06V 20/40; G06V 20/46;
(Continued)

(56) References Cited

U.S. PATENT DOCUMENTS

| | | | |
|---|---|---|---|
| 10,600,210 B1 | 3/2020 | Citraro et al. | |
| 11,232,594 B1 * | 1/2022 | Rana ................ | G02B 27/0172 |

(Continued)

FOREIGN PATENT DOCUMENTS

| | | |
|---|---|---|
| CN | 109462748 A | 3/2019 |
| CN | 109741245 A | 5/2019 |

(Continued)

OTHER PUBLICATIONS

Arróspide, Jon, Luis Salgado, and Marcos Nieto. "Vehicle detection and tracking using homography-based plane rectification and particle filtering." 2010 IEEE Intelligent Vehicles Symposium. IEEE, 2010.*

(Continued)

*Primary Examiner* — Shefali D Goradia
(74) *Attorney, Agent, or Firm* — Astute IP Law Group

(57) ABSTRACT

Embodiments of the present disclosure provide a plane estimation method and apparatus, an electronic device and a storage medium. The method includes: obtaining multiple video frames of a target video, extracting feature points from each of the multiple video frames, determining multiple same feature points in feature points of the multiple video frames, and determining position information of the multiple same feature points in the multiple video frames; determining a homography matrix of a plane between two adjacent video frames according to the position information of the multiple same feature points in the multiple video frames based on a random sample consensus algorithm; and determining parameter information of the plane between the two adjacent video frames according to the homography matrix of the plane.

20 Claims, 4 Drawing Sheets

(58) Field of Classification Search
CPC .. G06T 7/73; G06T 7/246; G06T 2207/10016
See application file for complete search history.

(56) References Cited

U.S. PATENT DOCUMENTS

| | | | | |
|---|---|---|---|---|
| 2003/0182076 | A1* | 9/2003 | Udomkesmalee | G01S 17/08 702/150 |
| 2007/0140531 | A1* | 6/2007 | Hamza | G06V 40/193 382/117 |
| 2013/0307934 | A1* | 11/2013 | Densham | G03B 31/00 348/46 |
| 2017/0140526 | A1* | 5/2017 | Chen | G06Q 30/018 |
| 2018/0075593 | A1 | 3/2018 | Wang et al. | |
| 2020/0184654 | A1* | 6/2020 | Kim | G06T 7/50 |
| 2021/0118150 | A1* | 4/2021 | Jia | G06T 7/246 |
| 2021/0120221 | A1* | 4/2021 | Li | G06T 7/579 |

FOREIGN PATENT DOCUMENTS

| | | |
|---|---|---|
| CN | 110276751 A | 9/2019 |
| CN | 110555868 A | 12/2019 |
| CN | 112598714 A | 4/2021 |

OTHER PUBLICATIONS

Sivaraman, Sayanan, and Mohan Manubhai Trivedi. "Looking at vehicles on the road: A survey of vision-based vehicle detection, tracking, and behavior analysis." IEEE transactions on intelligent transportation systems 14.4 (2013): 1773-1795.*

Office Action received for Chinese Patent Application No. 202110784263.6, mailed on May 16, 2025, 12 pages (6 pages of English Translation and 6 pages of Original Document).

International Search Report and Written Opinion, International Patent Application No. PCT/CN2022/099337, Aug. 23, 2022, with English translation of Search Report (8 pages).

* cited by examiner

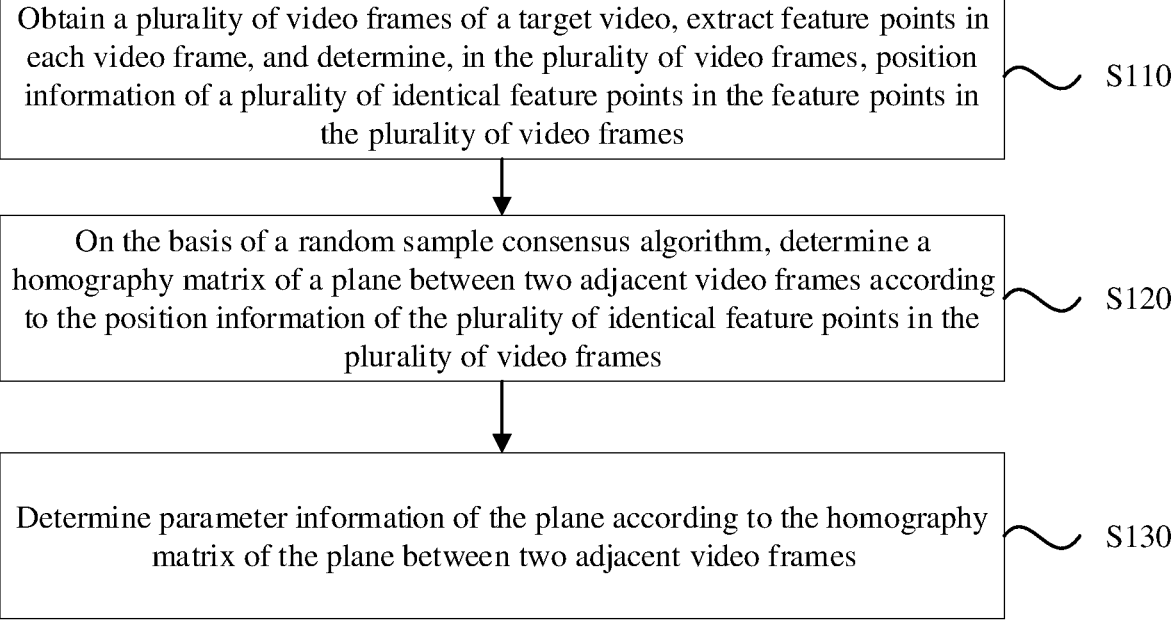

Obtain a plurality of video frames of a target video, extract feature points in each video frame, and determine, in the plurality of video frames, position information of a plurality of identical feature points in the feature points in the plurality of video frames          S110

On the basis of a random sample consensus algorithm, determine a homography matrix of a plane between two adjacent video frames according to the position information of the plurality of identical feature points in the plurality of video frames          S120

Determine parameter information of the plane according to the homography matrix of the plane between two adjacent video frames          S130

FIG. 1

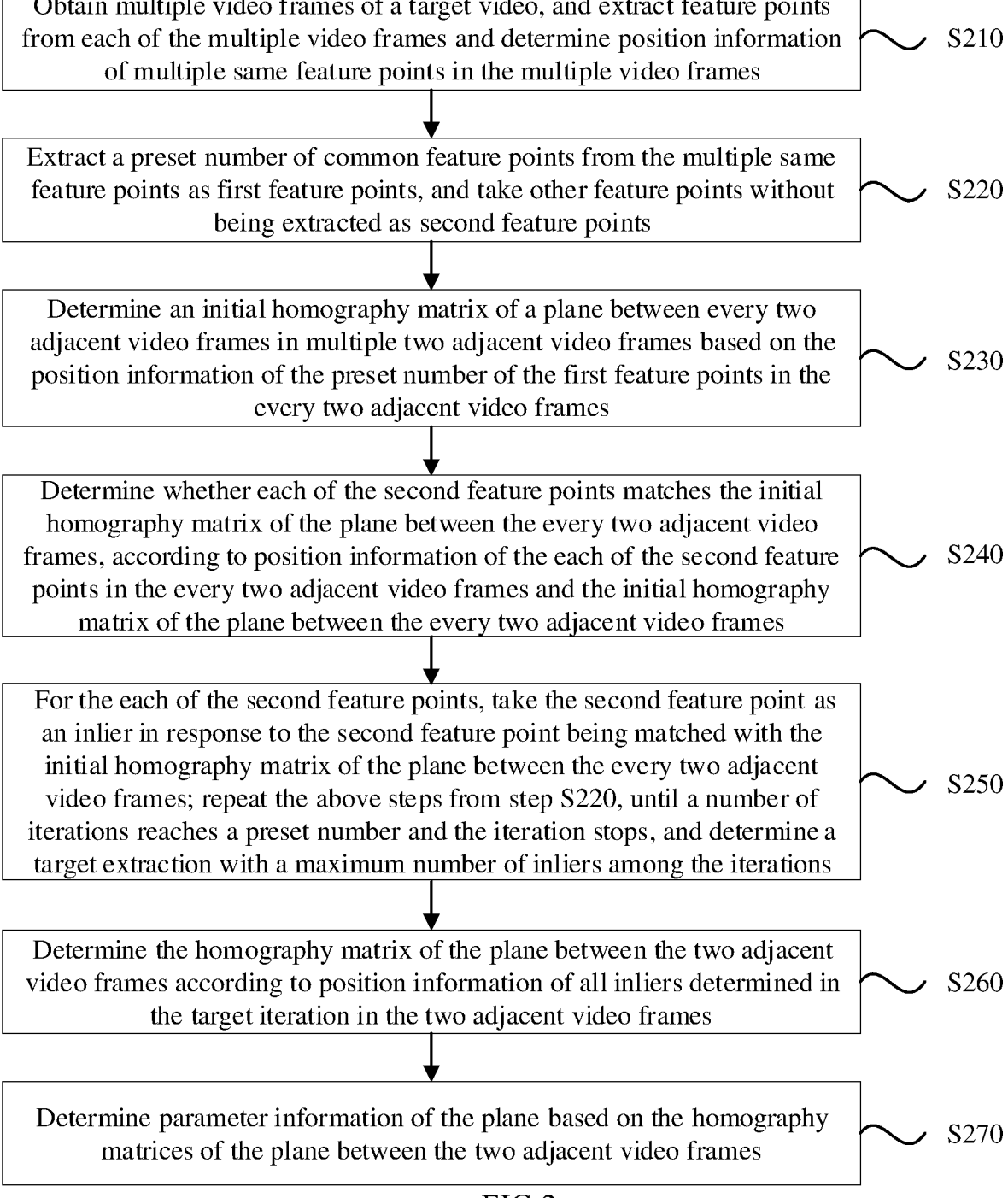

Obtain multiple video frames of a target video, and extract feature points from each of the multiple video frames and determine position information of multiple same feature points in the multiple video frames    S210

Extract a preset number of common feature points from the multiple same feature points as first feature points, and take other feature points without being extracted as second feature points    S220

Determine an initial homography matrix of a plane between every two adjacent video frames in multiple two adjacent video frames based on the position information of the preset number of the first feature points in the every two adjacent video frames    S230

Determine whether each of the second feature points matches the initial homography matrix of the plane between the every two adjacent video frames, according to position information of the each of the second feature points in the every two adjacent video frames and the initial homography matrix of the plane between the every two adjacent video frames    S240

For the each of the second feature points, take the second feature point as an inlier in response to the second feature point being matched with the initial homography matrix of the plane between the every two adjacent video frames; repeat the above steps from step S220, until a number of iterations reaches a preset number and the iteration stops, and determine a target extraction with a maximum number of inliers among the iterations    S250

Determine the homography matrix of the plane between the two adjacent video frames according to position information of all inliers determined in the target iteration in the two adjacent video frames    S260

Determine parameter information of the plane based on the homography matrices of the plane between the two adjacent video frames    S270

FIG.2

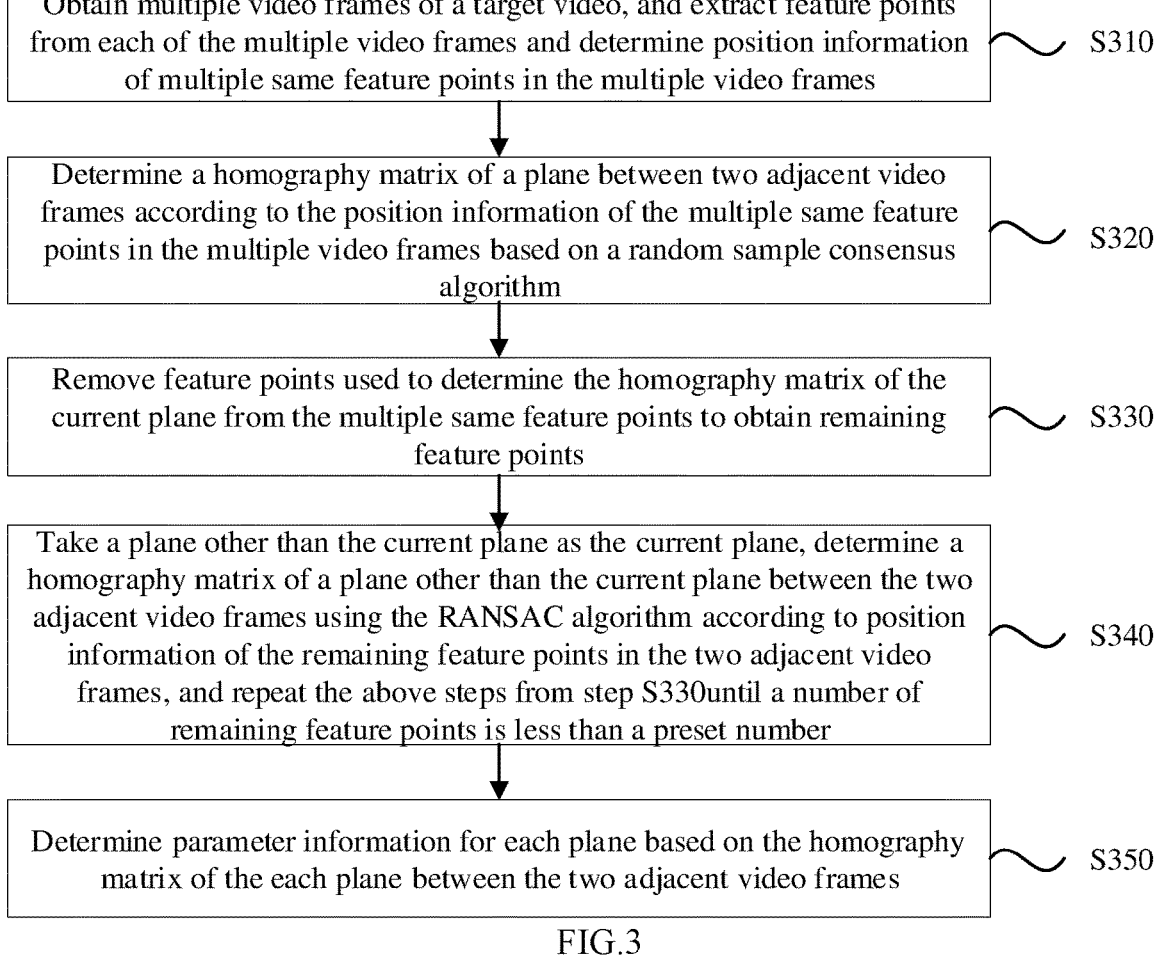

Obtain multiple video frames of a target video, and extract feature points from each of the multiple video frames and determine position information of multiple same feature points in the multiple video frames ⟶ S310

Determine a homography matrix of a plane between two adjacent video frames according to the position information of the multiple same feature points in the multiple video frames based on a random sample consensus algorithm ⟶ S320

Remove feature points used to determine the homography matrix of the current plane from the multiple same feature points to obtain remaining feature points ⟶ S330

Take a plane other than the current plane as the current plane, determine a homography matrix of a plane other than the current plane between the two adjacent video frames using the RANSAC algorithm according to position information of the remaining feature points in the two adjacent video frames, and repeat the above steps from step S330until a number of remaining feature points is less than a preset number ⟶ S340

Determine parameter information for each plane based on the homography matrix of the each plane between the two adjacent video frames ⟶ S350

FIG.3

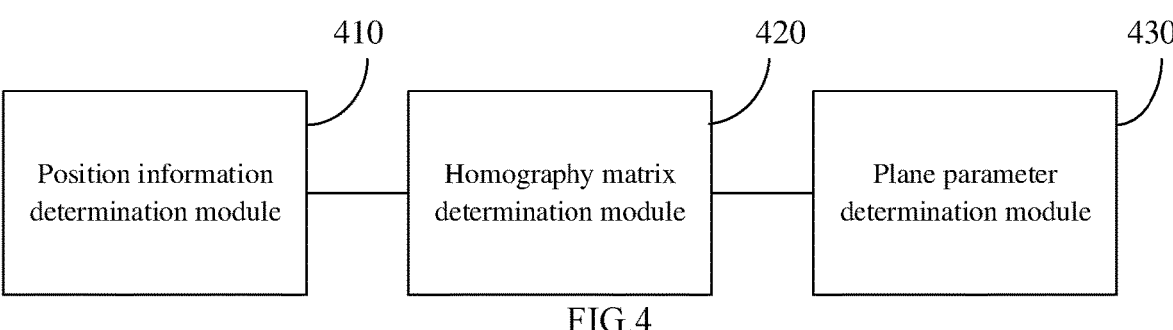

| Position information determination module | Homography matrix determination module | Plane parameter determination module |

PLANE ESTIMATION METHODS AND APPARATUS, ELECTRONIC DEVICES, AND STORAGE MEDIA

CROSS-REFERENCE TO RELATED APPLICATIONS

The present disclosure is a U.S. National Stage Application under 35 U.S.C. § 371 of International Patent Application No. PCT/CN2022/099337, filed on Jun. 17, 2022, which is based on and claims priority of Chinese application for invention No. 202110784263.6, filed on Jul. 12, 2021, the disclosures of both of which are hereby incorporated into this disclosure by reference in its entirety.

TECHNICAL FIELD

Embodiments of the present disclosure relate to the field of computer technology, and particularly to a plane estimation method, a plane estimation apparatus, an electronic device, and a storage medium.

BACKGROUND

In related technologies, a plane estimation of multiple video frames can be applied to many scenarios, such as a 3D (three-dimensional) reconstruction. A traditional method used for the plane estimation performed of the multiple video frames comprises: obtaining 3D point cloud data based on the Structure from Motion (SfM) technology of the multiple video frames; and performing a plane estimation based on the 3D point cloud data.

SUMMARY

Embodiments of the present disclosure provide a plane estimation method and apparatus, an electronic device, and a storage medium.

Some embodiments of the present disclosure provides a plane estimation method, comprising:

obtaining multiple video frames of a target video, extracting feature points from each of the multiple video frames, determining multiple same feature points in feature points of the multiple video frames, and determining position information of the multiple same feature points in the multiple video frames;

determining a homography matrix of a plane between two adjacent video frames according to the position information of the multiple same feature points in the multiple video frames based on a random sample consensus algorithm; and determining parameter information of the plane between the two adjacent video frames according to the homography matrix of the plane.

Some embodiments of the present disclosure further provides a plane estimation apparatus, comprising:

a position information determination module configured to obtain multiple video frames of a target video, extract feature points from each of the multiple video frames, determine multiple same feature points in feature points of the multiple video frames, and determine position information of the multiple same feature points in the multiple video frames;

a homography matrix determination module configured to determine a homography matrix of a plane between two adjacent video frames according to the position information of the multiple same feature points in the multiple video frames based on a random sample consensus algorithm; and a plane parameter determination module configured to determine parameter information of the plane between the two adjacent video frames according to the homography matrix of the plane.

Some embodiments of the present disclosure provides an electronic device, comprising:

at least one processor;

a storage device for storing at least one program, which when executed by the at least one processor, causes the at least one processor to implement the plane estimation method according to any embodiment of the present disclosure.

Some embodiments of the present disclosure further provides a non-transitory computer readable storage medium comprising computer executable instructions, which when executed by a computer processor cause the computer processor to execute the plane estimation method according to any embodiment of the present disclosure.

BRIEF DESCRIPTION OF THE DRAWINGS

The embodiments of the present disclosure will be described in detail below with reference to the drawings. Throughout the drawings, the same or similar reference signs indicate the same or similar elements. It should be understood that the drawings are schematic and the components and elements are not necessarily drawn to scale.

FIG. 1 is a flowchart of a plane estimation method provided in Embodiment 1 of the present disclosure;

FIG. 2 is a flowchart of a plane estimation method provided in Embodiment 2 of the present disclosure;

FIG. 3 is a flowchart of a plane estimation method provided in Embodiment 3 of the present disclosure;

FIG. 4 is a schematic structural diagram of a plane estimation apparatus provided in Embodiment 4 of the present disclosure;

DETAILED DESCRIPTION

Figure 5:
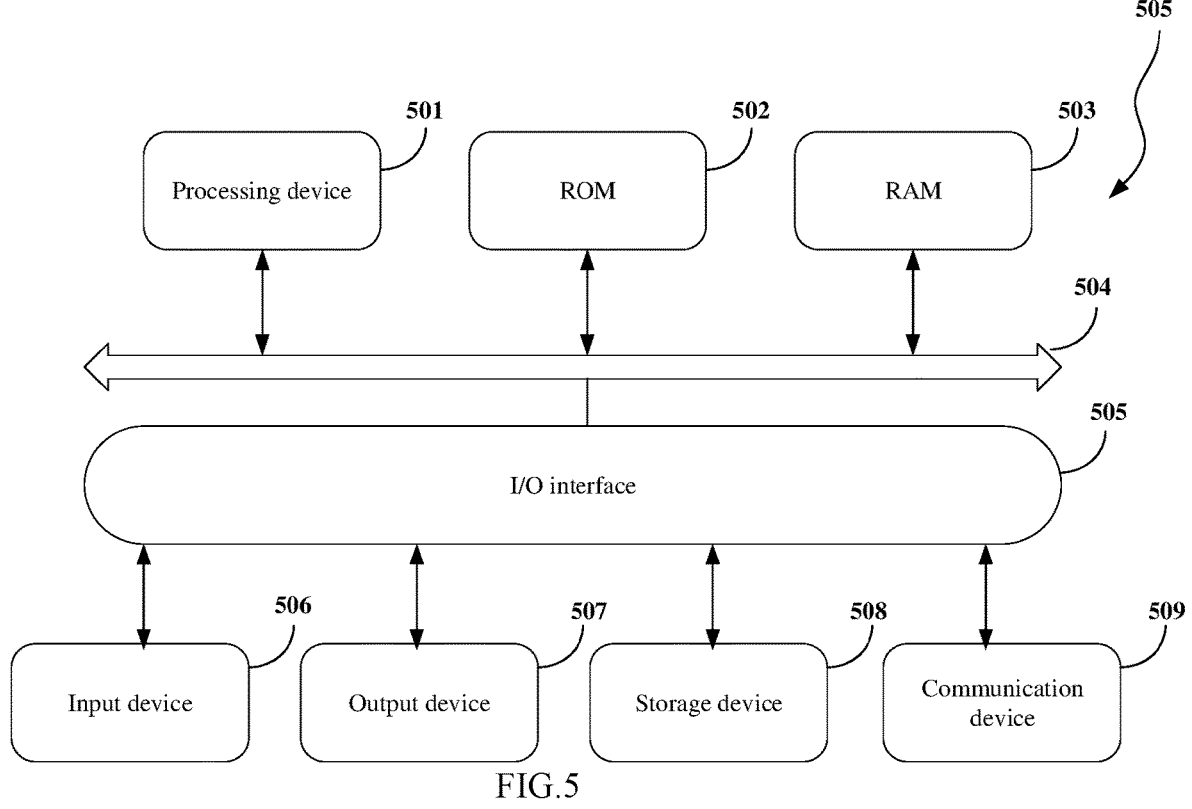
FIG. 5 is a schematic structural diagram of an electronic device provided in Embodiment 5 of the present disclosure.

Below, embodiments of this disclosure will be described with reference to the drawings. Although some exemplary embodiments of the present disclosure are shown in the drawings, it should be understood that the present disclosure can be implemented in various forms and should not be construed as limited to the embodiments set forth herein. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The inventor has found that in the traditional method, the quality of the 3D point cloud data depends on the accuracy of the SfM algorithm, and if the quality of 3D point cloud data is poor, it may lead to a poor plane estimation performance.

Embodiment 1

FIG. 1 is a flowchart of a plane estimation method provided in Embodiment 1 of the present disclosure. The embodiments of the present disclosure are applicable to a case of performing a plane estimation for multiple frame images, for example, to a case of estimating multiple planes for multiple video frames of a video. The method can be performed by a plane estimation apparatus, which can be implemented in the form of software and/or hardware. The apparatus can be provided in an electronic device, such as a computer.

As shown in FIG. 1, the plane estimation method provided in some embodiments comprises the following steps.

In S110, multiple video frames of a target video are obtained and feature points are extracted from each of the multiple video frames, multiple same feature points are determined in feature points of the multiple video frames and position information of the multiple same feature points is determined in the multiple video frames.

The target video is a video in which plane information needs to be determined. The target video can be obtained from a preset storage location or a real-time captured video can be used as the target video.

The multiple video frames can be obtained from the target video in different ways, comprising but not limited to: parsing each frame of the target video using an open-source program such as ffmpeg to obtain the video frames; or extracting the video frames from the target video at predetermined intervals through programming in Java.

The feature points can be directly extracted from the obtained video frames. Alternatively, the video frames can be filtered and the feature points can be extracted from the filtered video frames. The video frames can be filtered based on similarity of image content contained in the video frames (for example, for adjacent video frames with a content similarity greater than a preset value, only one of them is retained). Alternatively, the video frames can be filtered based on fixed time intervals between the video frames (for example, only one video frame is retained within a time interval). The video frames can be filtered in other ways that can be selected according to an application scenario, by no means exhaustive. By filtering the video frames, the efficiency of plane estimation can be guaranteed while ensuring the effectiveness of the plane estimation.

The feature points in a video frame can comprise, but are not limited to, corner points and/or local pixel feature points (such as pixels with maximum values, pixels with minimum values, etc.), and types of the feature points to be extracted can be specified according to an application scenario. Different types of feature points to be extracted can be extracted using different extraction algorithms. For example, if the feature points are corner points, the Harris corner detection algorithm can be used for extracting the corner points; if the feature points are local pixel feature points, the Difference of Gaussian (DoG) operator can be used to extract the local pixel features, by no means exhaustive. Feature points in the multiple video frames of a same type can be taken as a same feature point.

Position information of a feature point in a video frame can be considered as the pixel coordinates of the feature point in the video frame. After determining the feature points from each of the multiple video frames, positions of the multiple same feature points can be tracked across the multiple video frames. Furthermore, the position information of each of the multiple same feature points in each of the multiple video frames can be determined.

The positions of the multiple same feature points across the multiple video frames can be tracked using an optical flow algorithm, such as the Kanade-Lucas-Tomasi tracking method. Alternatively, feature point matching can be performed based on the principle of Orientated FAST and Rotated BRIEF (ORB) features to determine the position information of the multiple same feature points in each of the multiple video frames, by no means exhaustive.

In some embodiments, a track can be generated for each of the multiple same feature points to represent the position information of each of the multiple same feature points in the multiple video frames. For example, if there are n video frames, a track corresponding to a same feature point 1 may be $[x_{11}, y_{11}, x_{21}, y_{21}, x_{31}, y_{31} \ldots x_{n1}, y_{n1}]$; wherein, x is used to represent an abscissa of a pixel; y is used to represent an ordinate of the pixel; the first subscript digit of x or y represents a frame number of a video frame, and the second subscript digit represents a sequence number of the same feature point. For example, $x_{21}$ represents the abscissa (x-axis) of the pixel of the same feature point 1 in the second video frame.

In S120, a homography matrix of a plane between two adjacent video frames is determined according to the position information of the multiple same feature points in the multiple video frames based on a random sample consensus algorithm.

According to the random sample consensus algorithm (RANSAC) algorithm, parameters of a mathematical model fit by normal data (inliers) are calculated based on a sample data set containing the normal data and abnormal data (outliers). In some embodiments of the present disclosure, for determining a homography matrix of one plane between two adjacent video frames, the tracks of the same feature points can be used as a sample dataset. Particularly, the track of a same feature point that belong to the plane can be used as the normal data, while the track of a same feature points that do not belong to the plane can be used as the abnormal data. The homography matrix of the plane between the two adjacent video frames can be used as the parameters of the mathematical model that can be fit by the normal data.

For example, if there are n video frames, parameters of a mathematical model corresponding to Plane 1 can comprise a homography matrix of the plane between a first video frame and a second video frame, a homography matrix of the plane between the second video frame and a third video frame, . . . , and a homography matrix of the plane between a (n–1) video frame and a nth video frame. The n–1 homography matrices above can be used as the parameters of the mathematical model for Plane 1 that can be fit by the normal data.

A homography matrix of a plane can be considered as a perspective transformation matrix of the plane, which can be used to represent a perspective transformation of the plane from one view to another. The homography matrix can be defined using internal parameters (such as camera focal length, lens distortion, etc.) and external parameters (such as rotation matrix, translation matrix) of a camera used for video capture. The parameters in the homography matrix of the plane between two adjacent video frames can be calculated based on the position information of the same feature points in the two adjacent video frames. It can be considered that based on position information of feature points contained in the tracks of in each of the video frames, the homography matrix of the plane between every two adjacent video frames can be calculated.

In some embodiments, the position information of the each of the multiple same feature points in the each of the multiple video frames can be used as input of the RANSAC algorithm. Based on the RANSAC algorithm, same feature points are randomly sampled to determine same feature points that belong to a plane. Based on the tracks of the same feature points that belong to the plane, a homography matrix of the plane of every two adjacent video frames are output. By directly applying the RANSAC algorithm to the entire video, the homography matrix of the plane can be obtained as the basis for determining parameter information of the plane.

In S130, parameter information of the plane between the two adjacent video frames is determined according to the homography matrix of the plane.

The parameter information of the plane can be considered as the parameters in an expression of the plane in the spatial coordinate system. For example, if the expression of Plane 1 in the spatial coordinate system is $Ax+By+Cz+D=0$, then A, B, C, and D can be considered as the parameter information of the plane.

In some embodiments, the homography matrix of the plane between the two adjacent video frames can be decomposed to obtain internal parameters and external parameters of a camera defined therein. Furthermore, based on position information of feature points that belong to the plane in the video frames, as well as the internal parameters and external parameters of the camera, the parameters of the expression of the plane in the spatial coordinate system can be obtained, so as to obtain the parameter information of the plane.

Multiple decomposition methods can be used to decompose the homography matrix of the plane between the two adjacent video frames. For example, the homography matrix can be decomposed using the Faugeras (1988) method in Oriented FAST and Rotated BRIEF-Simultaneous Localization And Mapping 2 (ORB-SLAM2); alternatively, the homography matrix can be decomposed using the decompose Homography Mat function in OpenCV, which is implemented using the INRIA (2007) method, by no means exhaustive.

By directly applying the RANSAC algorithm in the multiple video frames to obtain parameter information of a plane(s) in the multiple video frames, the error introduced by the SfM algorithm can be avoided. Moreover, due to extensive amount of plane information contained in the multiple video frames, a plane estimation based on the video frames can not only quickly and conveniently determine the parameter information of multiple planes, but also achieve a better result of the plane estimation.

In some implementations, after determining the parameter information of the plane, the method further comprises: determining position and pose information of a virtual object according to the parameter information of the plane; and based on the position and pose information, displaying the virtual object in association with the plane in a preset video frame.

The virtual object can be an object with an appearance generated by artificial intelligence (AI) or a virtual control for interaction. The position and pose information of the virtual object can comprise, but is not limited to, information such as a position and a rotation angle of the virtual object in the spatial coordinate system. The preset video frame can be, for example, a video frame(s) containing a plane that needs to be displayed in association with the virtual object, or a video frame(s) within a preset time interval. The displaying the virtual object in association with the plane can comprise, but is not limited to: displaying the virtual object below the plane, displaying the virtual object hanging on the plane, etc.

After determining the parameter information of the plane, the position and rotation angle of the virtual object in the spatial coordinate system can also be determined based on an expression of the plane in the spatial coordinate system and a way the virtual object is displayed in association with the plane. For example, if the way the virtual object is displayed in association with the plane is to display the virtual object on the plane, the virtual object can be vertically displaced by a positive value based on the position and rotation angle of the plane in the spatial coordinate system.

After determining the position and pose information of the virtual object, pixel positions, a rotation angle and other information of the virtual object in the preset video frame can also be determined based on the position and rotation angle of the virtual object in the spatial coordinate system, and a conversion relationship between the coordinates of the plane in the spatial coordinate system and its coordinates in a pixel coordinate system in the preset video frame. Then, the virtual object can be rendered based on information such as the pixel positions and the rotation angle of the virtual object in the preset video frame. Because the position and pose information of the virtual object in the spatial coordinate system is determined depending on the way the virtual object is displayed in association with the plane, the virtual object can be rendered to display in association with the plane in the preset video frame.

In the embodiments, by rendering the virtual object based on a determined plane(s) contained in the video, augmented reality can be achieved for the video frames to improve user experience.

In the technical solution of the embodiments, the multiple video frames of the target video are obtained, the feature points are extracted from each of the multiple video frame, and the position information of the multiple same feature points in the multiple video frames are determined; the homography matrix of THE plane between the two adjacent video frames are determined using the RANSAC algorithm based on the position information of the multiple same feature points in the multiple video frames; and the parameter information of the plane is determined based on the homography matrix of the plane between the two adjacent video frames.

By directly applying the RANSAC algorithm in the multiple video frames to obtain the parameter information of the plane(s) in the multiple video frames, the error introduced by the SfM algorithm can be avoided. Moreover, due to the extensive amount of plane information contained in the multiple video frames, the plane estimation based on the video frames can not only quickly and conveniently determine the parameter information of multiple planes, but also achieve a better result of the plane estimation.

Embodiment 2

This embodiment can be combined with any optional scheme of the plane estimation method provided in the above embodiments. The plane estimation method provided in this embodiment describes the steps for determining a homography matrix of a plane between two adjacent video frames. By iteratively extracting a preset number of first feature points to estimate an initial homography matrix, and determining a number of inliers among second feature points based on the initial homography matrix, an iteration that can result in a maximum number of inliers can be determined. Furthermore, based on the position information of the inliers in the iteration that results in the maximum number of inliers belong can be determined. Thus, it is possible to directly apply the RANSAC algorithm to a video to quickly and conveniently determine parameter information of multiple planes in multiple frame images.

FIG. 2 is a flowchart of a plane estimation method provided in Embodiment 2 of the present disclosure. As shown in FIG. 2, the plane estimation method provided in this embodiment comprises the following steps.

In S210, multiple video frames of a target video are obtained, and feature points are extracted from each of the multiple video frames and position information of multiple same feature points is determined in the multiple video frames.

In S220, a preset number of common feature points are extracted from the multiple same feature points as first feature points, and other feature points without being extracted are taken as second feature points.

Determining a homography matrix of a plane between two adjacent video frames using the RANSAC algorithm based on the position information of the multiple same feature points in the multiple video frames, may comprise steps S220 to S250. Since the homography matrix has 8 degrees of freedom, the preset number must be at least 4 to determine the 8 unknown parameters in the homography matrix. It can be assumed that the preset number of the first feature points can be randomly extracted in each iteration.

In S230, an initial homography matrix of a plane between every two adjacent video frames in multiple two adjacent video frames is determined based on the position information of the preset number of the first feature points in the every two adjacent video frames.

The position information of the preset number of first feature points in the every two adjacent video frames can be determined from tracks of the preset number of first feature points. Then, initial homography matrix of the plane between every two adjacent video frames are determined based on the position information of the preset number of first feature points in the every two adjacent video frames.

In S240, whether each of the second feature points matches the initial homography matrix of the plane between the every two adjacent video frames is determined, according to position information of the each of the second feature points in the every two adjacent video frames and the initial homography matrix of the plane between the every two adjacent video frames.

After determining a set of initial homography matrices, the each of the second feature point can be used to verify whether the set of initial homography matrices is optimal. For example, for a track of a second feature point, if the position information of the second feature point in the every two adjacent video frames conforms to a mapping relationship represented by the set of initial homography matrices, the second feature point is considered to match all the initial homography matrices. The greater the number of second feature points that match all the initial homography matrices, the better the set of initial homography matrices, and thus the more likely the set of initial homography matrices can accurately represent a projection relationship of a plane between the multiple video frames.

In some embodiments, the determining whether the each of the second feature points matches the initial homography matrix of the plane between the every two adjacent video frames according to position information of the each of the second feature points in the every two adjacent video frames and the initial homography matrix of the plane between the every two adjacent video frames comprises: determining re-projection position information of the each of the second feature points in a succeeding (later) one of the every two video frames, according to the position information of the each of the second feature points in a preceding (earlier) one of the every two video frames and the initial homography matrix of the plane between the every two adjacent video frames; determining a re-projection error of the each of the second feature points between the every two adjacent video frames, according to position information and the re-projection position information of the each of the second feature points in the succeeding one of the every two video frames; determining whether the each of the second feature points matches the initial homography matrix of the plane between the every two adjacent video frames according to the re-projection error of the each of the second feature points between the every two adjacent video frames.

First, for each of the second feature points, the position information of the second feature point in a preceding one of two adjacent video frames can be substituted into the initial homography matrix of the plane between the two adjacent video frames to get the re-projection position information of the second feature point in the succeeding one of the two adjacent video frames. Next, based on a pixel distance (such as an Euclidean distance of pixel coordinates) between the position information and the re-projection position information of the second feature point in the succeeding one of the two adjacent video frames, a re-projection error of the second feature point between the two adjacent video frames is determined, and so on, so as to obtain the re-projection error of the second feature point between every two adjacent video frames. Next, a final error value can be determined by calculating an average re-projection error based on multiple re-projection errors, determining a median of the re-projection errors, or selecting a maximum/minimum error among the multiple re-projection errors. Finally, based on the final error value, it is determined whether the second feature point matches all the initial homography matrices. For example, if the final error value is less than a preset value, it can be determined the second feature point matches all the initial homography matrices.

For example, assuming that there are n video frames, an initial homography matrix of a plane between a first video frame and a second video frame is H1, . . . , and an initial homography matrix of the plane between a (n−1)th video frame and a nth video frame is Hn−1, a total of n−1 initial homography matrices are determined. If feature point 1 is a second feature point, and its track is [x11, y11, x21, y21, x31, y31 . . . xn1, yn1].

Then determining whether feature point 1 matches the initial homography matrices H1 to Hn−1 may comprise: substituting position information x11, y11 of feature point 1 in the first video frame into H1 to obtain re-projection position information x21' and y21' of feature point 1 in the second video frame; calculating a re-projection error w1 between (x21, y21), and (x21', y21') (such as an Euclidean distance between the two points); according to the above steps, adaptively calculate re-projection errors w2 to wn−1 corresponding to H2 to Hn−1; determining whether feature point 1 matches the initial homography matrices H1 to Hn−1 according to w1 to wn−1.

The determining whether the each of the second feature points matches the initial homography matrix of the plane between the every two adjacent video frames according to the re-projection error of the each of the second feature points between the every two video frames comprises: determining an average re-projection error according to the re-projection error of the each of the second feature points between the every two video frames; and determining whether the each of the second feature points matches the initial homography matrix of the plane between the every two adjacent video frames according to the average re-projection error and a preset threshold. For example, if the average re-projection error corresponding to a second feature point is less than the preset threshold, it can be determined that the second feature point matches all the initial homography matrices. Wherein, the preset threshold can be set based on an experimental or empirical value.

In the optional implementations, through determining multiple re-projection errors based on a track of a second feature point and multiple initial homography matrices, whether the second feature point matches all the initial homography matrices can be determined based on the multiple re-projection errors.

In S250, for the each of the second feature points, the second feature point is taken as an inlier in response the second feature point being matched with the initial homography matrix of the plane between the every two adjacent video frames; the above steps are repeated from step S220, until a number of iterations reaches a preset number and the iteration stops, and a target extraction with a maximum number of inliers is determined among the iterations.

In the embodiments, the preset number of first feature points that are randomly extracted may be feature points that belong to a same plane or feature points that do not belong to a same plane. In general, if the preset number of randomly extracted first feature points belong to the same plane, any second feature point belonging to that plane can match all the initial homography matrices; if the preset number of randomly extracted first feature points do not belong to the same plane, then in principle only a few second feature points can match all the initial homography matrices.

The number of iterations can be specified in advance based on experience or experimental values. By performing the preset number of iterations, in each iteration, the preset number of first feature points can be extracted to determine multiple initial homography matrices of the plane, and the number of second feature points that are determined as the inliers can be determined. Then, based on the position information of all inliers in the every two adjacent video frames in the iteration that results in the maximum number of inliers, the initial homography matrix of the plane between every two adjacent video frames can be determined, so as to obtain an optimal solution of the initial homography matrices.

In S260, the homography matrix of the plane between the two adjacent video frames is determined according to position information of all inliers determined in the target iteration in the two adjacent video frames.

In the embodiments, after determining the optimal solution for each of the initial homography matrices, all the initial homography matrices can be optimized using the tracks of all inliers to obtain the final homography matrix of the plane between the each of every two adjacent video frames.

In S270, parameter information of the plane is determined based on the homography matrices of the plane between the two adjacent video frames.

The technical solution of the embodiments describe the step of determining the homography matrices of multiple planes between adjacent video frames. By iteratively extracting the preset number of the first feature points to estimate the initial homography matrices, and determining the number of inliers among the second feature points based on the initial homography matrices, an iteration that can result in the maximum number of inliers can be determined. Furthermore, based on the position information of the inliers in the iteration that results in the maximum number of inliers, the homography matrix of the plane to which these inliers belong can be determined. Thus, it is possible to directly apply the RANSAC algorithm to a video to quickly and conveniently determine the parameter information of planes in multiple frame images.

The plane estimation method provided by the embodiment of the present disclosure and the plane estimation method provided by the above embodiments belong to a same inventive concept. For the technical details not described in detail in the embodiment, reference can be made to the above embodiments, and the embodiment can achieve a same beneficial effect as the above embodiments.

Embodiment 3

The embodiment can be combined with the optional schemes of the plane estimation method provided in the above embodiments. The plane estimation method provided in the embodiment describes the steps for determining homography matrices of multiple planes in a video. After parameter information of any plane in the video is determined, feature points used to determine the plane can be removed, and remaining feature points can be used in looped RANSAC processing to estimate multiple planes in the video. Thus, it is possible to quickly and conveniently determine parameter information of the multiple planes in the video.

FIG. 3 is a flowchart of a plane estimation method provided in Embodiment 3 of the present disclosure. As shown in FIG. 3, the plane estimation method provided in this embodiment comprises the following steps.

In S310, multiple video frames of a target video are obtained, and feature points are extracted from each of the multiple video frames to determine position information of multiple same feature points in the multiple video frames.

In S320, a homography matrix of a plane between two adjacent video frames is determined using a random sample consensus (RANSAC) algorithm according to the position information of the multiple same feature points in the multiple video frames.

A homography matrix of the plane between the two adjacent video frames that is currently determined can be used as a homography matrix of a current plane between the two adjacent video frames. The method for determining the homography matrix of the current plane between the two adjacent video frames may be the same as the method for determining the homography matrix of any plane between any two adjacent video frames, and reference can be made to the above for details, which will not be repeated here.

In S330, feature points used to determine the homography matrix of the current plane are removed from the multiple same feature points to obtain remaining feature points.

In some embodiments, since the video can contain plane information of multiple planes, after determining the homography matrix of the current plane between the two adjacent video frames, the feature points used to determine the homography matrix of the current plane can be removed, and the RANSAC process can be performed continuously to determine parameter information of other planes.

In S340, a plane other than the current plane is taken as the current plane, a homography matrix of the current plane between the two adjacent video frames is determined using the RANSAC algorithm according to position information of the remaining feature points in the two adjacent video frames, and the above steps are repeated from step S330 until a number of remaining feature points is less than a preset number.

In the embodiments, the preset number can be set based on experimental or empirical values. When the number of the remaining feature points is less than the preset number, it can be considered that parameter information has already been evaluated for all planes contained in the video that can be estimated. At this point, the removal of feature points used to determine the homography matrix of the current plane can be stopped, and the execution of the RANSAC algorithm can be stopped.

In S350, parameter information is determined for each plane based on the homography matrix of the each plane between the two adjacent video frames.

In the embodiments, the parameter information of a plane can be determined when the homography matrix of the plane between the two adjacent video frames is determined. It is also possible to determine parameter information of all planes when the homography matrices of all the plane between the two adjacent video frames are determined.

The technical solution of the embodiments describe the step of determining the homography matrices of multiple planes in the video. After the parameter information of any plane in the video is determined, the feature points used to determine that plane can be removed, and the remaining feature points can be used in a looped RANSAC processing to estimate multiple planes in the video. Thus, it is possible to quickly and conveniently determine the parameter information of the multiple planes in the video.

The plane estimation method provided by the embodiment of the present disclosure and the plane estimation method provided by the above embodiments belong to a same inventive concept. For the technical details not described in detail in the embodiment, reference can be made to the above embodiments, and the embodiment can achieve a same beneficial effect as the above embodiment.

Embodiment 4

FIG. 4 is a schematic structural diagram of a plane estimation apparatus provided in Embodiment 4 of the present disclosure. The plane estimation apparatus provided in this embodiment is applicable to the case of plane estimation in multiple frame images, for example, to the case of multi-plane estimation in multiple video frames of a video.

As shown in FIG. 4, the plane estimation apparatus provided in this embodiment comprises: a position information determination module 410 configured to obtain multiple video frames of a target video, extract feature points from each of the multiple video frames, determine multiple same feature points in feature points of the multiple video frames, and determine position information of the multiple same feature points in the multiple video frames; a homography matrix determination module 420 configured to determine a homography matrix of a plane between two adjacent video frames according to the position information of the multiple same feature points in the multiple video frames based on a random sample consensus algorithm; a plane parameter determination module 430 configured to determine parameter information of the plane between the two adjacent video frames according to the homography matrix of the plane.

In some embodiments, the homography matrix determination module comprises: an extraction unit configured to extract a preset number of feature points from the multiple same feature points as first feature points, and taking other feature points without being extracted as second feature points; an initial matrix determination unit configured to determine an initial homography matrix of a plane between every two adjacent video frames based on position information of the first feature points in the every two adjacent video frames; a determination unit configured to determine whether each of the second feature points matches the initial homography matrix of the plane between the every two adjacent video frames according to position information of the each of the second feature points in the every two adjacent video frames and the initial homography matrix of the plane between the every two adjacent video frames; an inlier determination unit configured to, for the each of the second feature points, take the second feature point as an inlier in response to the second feature point being matched with the initial homography matrix of the plane between the every two adjacent video frames, repeat the above steps from the extracting a preset number of feature points from the multiple same feature points as first feature points until a number of iterations reaches a preset number, and determine a target iteration with a maximum number of inliers among the iterations; and a final matrix determination unit configured to determine the homography matrix of the plane between the two adjacent video frames according to position information of all inliers determined in the target iteration in the two adjacent video frames.

In some embodiments, the determination unit comprises: a re-projection subunit configured to determine re-projection position information of the each of the second feature points in a succeeding one of the every two video frames, according to the position information of the each of the second feature points in a preceding one of the every two video frames and the initial homography matrix of the plane between the every two adjacent video frames; an error determination subunit configured to determine a re-projection error of the each of the second feature points between the every two adjacent video frames, according to position information and the re-projection position information of the each of the second feature points in the succeeding one of the every two video frames; and a determination subunit configured to determine whether the each of the second feature points matches the initial homography matrix of the plane between the every two adjacent video frames according to the re-projection error of the each of the second feature points between the every two adjacent video frames.

In some embodiments, the determination subunit is configured to determination average re-projection error according to the re-projection error of the each of the second feature points between the every two video frames; and determine whether the each of the second feature points matches the initial homography matrix of the plane between the every two adjacent video frames according to the average re-projection error and a preset threshold.

In some embodiments, the homography matrix determination module comprises: a removing unit configured to, after determining a homography matrix of a current plane between the two adjacent video frames, remove feature points used to determine the homography matrix of the current plane from the multiple same feature points to obtain remaining feature points; and a matrix determination unit configured to take a plane other than the current plane as the current plane, determine a homography matrix of the current plane between the two adjacent video frames using the random sample consensus algorithm according to position information of the remaining feature points in the two adjacent video frames, and repeat the above steps from the removing feature points used to determine the homography matrix of the current plane from the multiple same feature points to obtain remaining feature points until a number of remaining feature points is less than a preset number.

In some embodiments, the plane estimation apparatus further comprises: a virtual display module configured to, after determining the parameter information of the plane, determine position and pose information of a virtual object according to the parameter information of the plane; and display the virtual object in association with the plane in a preset video frame according to the position and pose information.

The plane estimation apparatus provided in the embodiments of the present disclosure can execute the plane estimation method provided in any embodiment of the present disclosure, and has corresponding functional modules to implement the method and achieve the beneficial effect of the present disclosure.

It should be noted that the units and modules comprised in the above apparatus are only divided according to the functional logic, but are not limited to the above division, as long as the corresponding functions can be realized; In addition, the specific names of the functional units are only for the convenience of distinguishing from each other, and are not used to limit the protection scope of the embodiments of the present disclosure.

Embodiment 5

Referring to FIG. 5, a structural diagram of an electronic device (e.g., a terminal device or server shown in FIG. 5) 500 suitable for implementing an embodiment of the present disclosure is shown. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 5 is merely an example and should not impose any limitation on the function and scope of the embodiment of the present disclosure.

As shown in FIG. 5, the electronic device 500 may comprise a processing device (e.g., a central processing unit, a graphics processor) 501, which may perform various appropriate actions and processes according to a program stored in Read Only Memory (ROM) 502 or a program loaded from storage device 506 into Random Access Memory (RAM) 503. In RAM 503, various programs and data required for the operation of the electronic device 600 are also stored. Processing device 501, ROM 502 and RAM 503 are connected to each other through bus 504. Input/Output (I/O) interface 405 is also connected to bus 504.

Generally, the following devices can be connected to I/O interface 505: input devices 506 comprising, for example, a touch screen, a touch pad, a keyboard, a mouse, a camera, a microphone, an accelerometer, a gyroscope, etc.; output devices 507 comprising a liquid crystal display (LCD), a speaker, a vibrator, etc.; a storage device 508 such as a magnetic tape, a hard disk, etc.; and a communication device 509. The communication device 509 enables the electronic device 500 to communicate wirelessly or wirelessly with other devices to exchange data. Although FIG. 5 shows the electronic device 500 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 509, or installed from the storage device 506, or from the ROM 502. When the computer program is executed by the processing device 501, the above functions defined in the plane estimation method of the embodiment of the present disclosure are performed.

The electronic device provided by this embodiment of the present disclosure and the plane estimation method provided by the above embodiment belong to the same inventive concept. For the technical details not described in detail in this embodiment, reference can be made to the above embodiment, and this embodiment can achieve the same beneficial effect as the above embodiment.

Embodiment 6

An embodiment of the present application provides a computer storage medium on which a computer program is stored, which when executed by a processor implements the plane estimation method provided in the above embodiment.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM) or flash memory (FLASH), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a Local Area Network ("LAN"), a Wide Area Network ("WAN"), an Internet (e.g., the Internet), and an end-to-end network (e. g., an ad hoc end-to-end network), as well as any currently known or future developed network.

The above computer-readable medium may be comprised in the electronic device described above; or it may exist alone without being assembled into the electronic device.

The computer-readable medium carries one or more programs that cause, when executed by the electronic device, the electronic device to: obtain multiple video frames of a target video, extract feature points from each video frame, and determine position information of multiple common feature points in the multiple video frames; determine homography matrices of a plane between adjacent video frames using a random sample consensus (RANSAC) algorithm based on the position information of the multiple common feature points in the multiple video frames; and determine parameter information of the plane based on the homography matrices of the plane between the adjacent video frames.

The computer program code for executing operations of the present disclosure may be complied by any combination of one or more program design languages, the program design languages comprising object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the FIG.s. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units or modules do not constitute a limitation on the units or modules themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, [Example 1] provides a plane estimation method, comprising: obtaining multiple video frames of a target video, extracting feature points from each of the multiple video frames, determining multiple same feature points in feature points of the multiple video frames, and determining position information of the multiple same feature points in the multiple video frames; determining a homography matrix of a plane between two adjacent video frames according to the position information of the multiple same feature points in the multiple video frames based on a random sample consensus algorithm; and determining parameter information of the plane between the two adjacent video frames according to the homography matrix of the plane.

According to one or more embodiments of the present disclosure, [Example 2] provides a plane estimation method, further comprising: in some optional implementation, the determining a homography matrix of a plane between two adjacent video frames according to the position information of multiple same feature points in the video frames based on a random sample consensus algorithm comprises: extracting a preset number of feature points from the multiple same feature points as first feature points, and taking other feature points without being extracted as second feature points;

determining an initial homography matrix of a plane between every two adjacent video frames based on position information of the first feature points in the every two adjacent video frames; determining whether each of the second feature points matches the initial homography matrix of the plane between the every two adjacent video frames according to position information of the each of the second feature points in the every two adjacent video frames and the initial homography matrix of the plane between the every two adjacent video frames; for the each of the second feature points, taking the second feature point as an inlier in response to the second feature point being matched with the initial homography matrix of the plane between the every two adjacent video frames, repeating the above steps from the extracting a preset number of feature points from the multiple same feature points as first feature points until a number of iterations reaches a preset number, and determining a target iteration with a maximum number of inliers among the iterations; and determining the homography matrix of the plane between the two adjacent video frames according to position information of all inliers determined in the target iteration in the two adjacent video frames.

According to one or more embodiments of the present disclosure, [Example 3] provides a plane estimation method, further comprising: in some optional implementations, the determining whether each of the second feature points matches the initial homography matrix of the plane between the every two adjacent video frames according to position information of the each of the second feature points in the every two adjacent video frames and the initial homography matrix of the plane between the every two adjacent video frames comprises: determining re-projection position information of the each of the second feature points in a succeeding one of the every two video frames, according to the position information of the each of the second feature points in a preceding one of the every two video frames and the initial homography matrix of the plane between the every two adjacent video frames; determining a re-projection error of the each of the second feature points between the every two adjacent video frames, according to position information and the re-projection position information of the each of the second feature points in the succeeding one of the every two video frames; and determining whether the each of the second feature points matches the initial homography matrix of the plane between the every two adjacent video frames according to the re-projection error of the each of the second feature points between the every two adjacent video frames.

According to one or more embodiments of the present disclosure, [Example 4] provides a plane estimation method, further comprising: in some optional implementations, the determining whether the each of the second feature points matches the initial homography matrix of the plane between the every two adjacent video frames according to the re-projection error of the each of the second feature points between the every two adjacent video frames comprises: determining an average re-projection error according to the re-projection error of the each of the second feature points between the every two video frames; and determining whether the each of the second feature points matches the initial homography matrix of the plane between the every two adjacent video frames according to the average re-projection error and a preset threshold.

According to one or more embodiments of the present disclosure, [Example 5] provides a plane estimation method, further comprising: in some optional implementation, the determining a homography matrix of a plane between two adjacent video frames comprises: after determining a homography matrix of a current plane between the two adjacent video frames, removing feature points used to determine the homography matrix of the current plane from the multiple same feature points to obtain remaining feature points; and taking a plane other than the current plane as the current plane, determining a homography matrix of the current plane between the two adjacent video frames using the random sample consensus algorithm according to position information of the remaining feature points in the two adjacent video frames, and repeating the above steps from the removing feature points used to determine the homography matrix of the current plane from the multiple same feature points to obtain remaining feature points until a number of remaining feature points is less than a preset number.

According to one or more embodiments of the present disclosure, [Example 6] provides a plane estimation method, further comprising: in some optional implementations, after determining the parameter information of the plane, determining position and pose information of a virtual object according to the parameter information of the plane; and displaying the virtual object in association with the plane in a preset video frame according to the position and pose information.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

What is claimed is:

1. A plane estimation method, comprising:
obtaining multiple video frames of a target video, extracting feature points from each of the multiple video frames, determining multiple same feature points in feature points of the multiple video frames, and determining position information of the multiple same feature points in the multiple video frames;
determining a homography matrix of a plane between two adjacent video frames according to the position information of the multiple same feature points in the multiple video frames based on a random sample consensus algorithm; and
determining parameter information of the plane between the two adjacent video frames according to the homography matrix of the plane.

2. The plane estimation method according to claim 1, wherein the determining a homography matrix of a plane between two adjacent video frames according to the position information of multiple same feature points in the video frames based on a random sample consensus algorithm comprises:
extracting a preset number of feature points from the multiple same feature points as first feature points, and taking other feature points without being extracted as second feature points;
determining an initial homography matrix of a plane between every two adjacent video frames based on position information of the first feature points in the every two adjacent video frames;

determining whether each of the second feature points matches the initial homography matrix of the plane between the every two adjacent video frames according to position information of the each of the second feature points in the every two adjacent video frames and the initial homography matrix of the plane between the every two adjacent video frames;

for the each of the second feature points, taking the second feature point as an inlier in response to the second feature point being matched with the initial homography matrix of the plane between the every two adjacent video frames, repeating the above steps from the extracting a preset number of feature points from the multiple same features points as first feature points until a number of iterations reaches a preset number, and determining a target iteration with a maximum number of inliers among the iterations; and determining the homography matrix of the plane between the two adjacent video frames according to position information of all inliers determined in the target iteration in the two adjacent video frames.

3. The plane estimation method according to claim 2, wherein the determining whether each of the second feature points matches the initial homography matrix of the plane between the every two adjacent video frames according to position information of the each of the second feature points in the every two adjacent video frames and the initial homography matrix of the plane between the every two adjacent video frames comprises:

determining re-projection position information of the each of the second feature points in a succeeding one of the every two video frames, according to the position information of the each of the second feature points in a preceding one of the every two video frames and the initial homography matrix of the plane between the every two adjacent video frames;

determining a re-projection error of the each of the second feature points between the every two adjacent video frames, according to position information and the re-projection position information of the each of the second feature points in the succeeding one of the every two video frames; and determining whether the each of the second feature points matches the initial homography matrix of the plane between the every two adjacent video frames according to the re-projection error of the each of the second feature points between the every two adjacent video frames.

4. The plane estimation method according to claim 3, wherein the determining whether the each of the second feature points matches the initial homography matrix of the plane between the every two adjacent video frames according to the re-projection error of the each of the second feature points between the every two adjacent video frames comprises:

determining an average re-projection error according to the re-projection error of the each of the second feature points between the every two video frames; and determining whether the each of the second feature points matches the initial homography matrix of the plane between the every two adjacent video frames according to the average re-projection error and a preset threshold.

5. The plane estimation method according to claim 1, wherein the determining a homography matrix of a plane between two adjacent video frames comprises:

after determining a homography matrix of a current plane between the two adjacent video frames, removing feature points used to determine the homography matrix of the current plane from the multiple same feature points to obtain remaining feature points; and taking a plane other than the current plane as the current plane, determining a homography matrix of the current plane between the two adjacent video frames using the random sample consensus algorithm according to position information of the remaining feature points in the two adjacent video frames, and repeating the above steps from the removing feature points used to determine the homography matrix of the current plane from the multiple same feature points to obtain remaining feature points until a number of remaining feature points is less than a preset number.

6. The plane estimation method according to claim 1, further comprising: after determining the parameter information of the plane, determining position and pose information of a virtual object according to the parameter information of the plane; and displaying the virtual object in association with the plane in a preset video frame according to the position and pose information.

7. An electronic device, comprising:

at least one processor;

a storage device for storing at least one program, which when executed by the at least one processor, causes the at least one processor to implement the plane estimation method according to of claim 1.

8. The electronic device according to claim 7, wherein the determining a homography matrix of a plane between two adjacent video frames according to the position information of multiple same feature points in the video frames based on a random sample consensus algorithm comprises:

extracting a preset number of feature points from the multiple same feature points as first feature points, and taking other feature points without being extracted as second feature points;

determining an initial homography matrix of a plane between every two adjacent video frames based on position information of the first feature points in the every two adjacent video frames;

determining whether each of the second feature points matches the initial homography matrix of the plane between the every two adjacent video frames according to position information of the each of the second feature points in the every two adjacent video frames and the initial homography matrix of the plane between the every two adjacent video frames;

for the each of the second feature points, taking the second feature point as an inlier in response to the second feature point being matched with the initial homography matrix of the plane between the every two adjacent video frames, repeating the above steps from the extracting a preset number of feature points from the multiple same feature points as first feature points until a number of iterations reaches a preset number, and determining a target iteration with a maximum number of inliers among the iterations; and determining the homography matrix of the plane between the two adjacent video frames according to position information of all inliers determined in the target iteration in the two adjacent video frames.

9. The electronic device according to claim 8, wherein the determining whether each of the second feature points matches the initial homography matrix of the plane between the every two adjacent video frames according to position information of the each of the second feature points in the every two adjacent video frames and the initial homography matrix of the plane between the every two adjacent video frames comprises:

determining re-projection position information of the each of the second feature points in a succeeding one of the every two video frames, according to the position information of the each of the second feature points in a preceding one of the every two video frames and the initial homography matrix of the plane between the every two adjacent video frames;

determining a re-projection error of the each of the second feature points between the every two adjacent video frames, according to position information and the re-projection position information of the each of the second feature points in the succeeding one of the every two video frames; and determining whether the each of the second feature points matches the initial homography matrix of the plane between the every two adjacent video frames according to the re-projection error of the each of the second feature points between the every two adjacent video frames.

10. The electronic device according to claim 9, wherein the determining whether the each of the second feature points matches the initial homography matrix of the plane between the every two adjacent video frames according to the re-projection error of the each of the second feature points between the every two adjacent video frames comprises:

determining an average re-projection error according to the re-projection error of the each of the second feature points between the every two video frames; and determining whether the each of the second feature points matches the initial homography matrix of the plane between the every two adjacent video frames according to the average re-projection error and a preset threshold.

11. The electronic device according to claim 7, wherein the determining a homography matrix of a plane between two adjacent video frames comprises:

after determining a homography matrix of a current plane between the two adjacent video frames, removing feature points used to determine the homography matrix of the current plane from the multiple same feature points to obtain remaining feature points; and taking a plane other than the current plane as the current plane, determining a homography matrix of the current plane between the two adjacent video frames using the random sample consensus algorithm according to position information of the remaining feature points in the two adjacent video frames, and repeating the above steps from the removing feature points used to determine the homography matrix of the current plane from the multiple same feature points to obtain remaining feature points until a number of remaining feature points is less than a preset number.

12. The electronic device according to claim 7, wherein storage device further stores at least one program, which when executed by the at least one processor, causes the at least one processor to, after determining the parameter information of the plane, determine position and pose information of a virtual object according to the parameter information of the plane; and display the virtual object in association with the plane in a preset video frame according to the position and pose information.

13. A non-transitory computer readable storage medium comprising computer executable instructions, which when executed by a computer processor cause the computer processor to execute the plane estimation method according to of claim 1.

14. The non-transitory computer readable storage medium according to claim 13, wherein the determining a homography matrix of a plane between two adjacent video frames according to the position information of multiple same feature points in the video frames based on a random sample consensus algorithm comprises:

extracting a preset number of feature points from the multiple same feature points as first feature points, and taking other feature points without being extracted as second feature points;

determining an initial homography matrix of a plane between every two adjacent video frames based on position information of the first feature points in the every two adjacent video frames;

determining whether each of the second feature points matches the initial homography matrix of the plane between the every two adjacent video frames according to position information of the each of the second feature points in the every two adjacent video frames and the initial homography matrix of the plane between the every two adjacent video frames;

for the each of the second feature points, taking the second feature point as an inlier in response to the second feature point being matched with the initial homography matrix of the plane between the every two adjacent video frames, repeating the above steps from the extracting a preset number of feature points from the multiple same feature points as first feature points until a number of iterations reaches a preset number, and determining a target iteration with a maximum number of inliers among the iterations; and determining the homography matrix of the plane between the two adjacent video frames according to position information of all inliers determined in the target iteration in the two adjacent video frames.

15. The non-transitory computer readable storage medium according to claim 14, wherein the determining whether each of the second feature points matches the initial homography matrix of the plane between the every two adjacent video frames according to position information of the each of the second feature points in the every two adjacent video frames and the initial homography matrix of the plane between the every two adjacent video frames comprises:

determining re-projection position information of the each of the second feature points in a succeeding one of the every two video frames, according to the position information of the each of the second feature points in a preceding one of the every two video frames and the initial homography matrix of the plane between the every two adjacent video frames;

determining a re-projection error of the each of the second feature points between the every two adjacent video frames, according to position information and the re-projection position information of the each of the second feature points in the succeeding one of the every two video frames; and determining whether the each of the second feature points matches the initial homography matrix of the plane between the every two adjacent video frames according to the re-projection error of the each of the second feature points between the every two adjacent video frames.

16. The non-transitory computer readable storage medium according to claim 15, wherein the determining whether the each of the second feature points matches the initial homography matrix of the plane between the every two adjacent video frames according to the re-projection error of the each of the second feature points between the every two adjacent video frames comprises:

determining an average re-projection error according to the re-projection error of the each of the second feature points between the every two video frames; and determining whether the each of the second feature points matches the initial homography matrix of the plane between the every two adjacent video frames according to the average re-projection error and a preset threshold.

17. The non-transitory computer readable storage medium according to claim 13, wherein the determining a homography matrix of a plane between two adjacent video frames comprises:

after determining a homography matrix of a current plane between the two adjacent video frames, removing feature points used to determine the homography matrix of the current plane from the multiple same feature points to obtain remaining feature points; and taking a plane other than the current plane as the current plane, determining a homography matrix of the current plane between the two adjacent video frames using the random sample consensus algorithm according to position information of the remaining feature points in the two adjacent video frames, and repeating the above steps from the removing feature points used to determine the homography matrix of the current plane from the multiple same feature points to obtain remaining feature points until a number of remaining feature points is less than a preset number.

18. The non-transitory computer readable storage medium according to claim 13, further storing at least one program, which when executed by the at least one processor, causes the at least one processor to after determining the parameter information of the plane, determine position and pose information of a virtual object according to the parameter information of the plane; and display the virtual object in association with the plane in a preset video frame according to the position and pose information.

19. A plane estimation apparatus, comprising:

a position information determination module configured to obtain multiple video frames of a target video, extract feature points from each of the multiple video frames, determine multiple same feature points in feature points of the multiple video frames, and determine position information of the multiple same feature points in the multiple video frames;

a homography matrix determination module configured to determine a homography matrix of a plane between two adjacent video frames according to the position information of the multiple same feature points in the multiple video frames based on a random sample consensus algorithm; and a plane parameter determination module configured to determine parameter information of the plane between the two adjacent video frames according to the homography matrix of the plane.

20. The plane estimation apparatus according to claim 19, wherein the homography matrix determination module comprises:

an extraction unit configured to extract a preset number of feature points from the multiple same feature points as first feature points, and taking other feature points without being extracted as second feature points;

an initial matrix determination unit configured to determine an initial homography matrix of a plane between every two adjacent video frames based on position information of the first feature points in the every two adjacent video frames;

a determination unit configured to determine whether each of the second feature points matches the initial homography matrix of the plane between the every two adjacent video frames according to position information of the each of the second feature points in the every two adjacent video frames and the initial homography matrix of the plane between the every two adjacent video frames;

an inlier determination unit configured to, for the each of the second feature points, take the second feature point as an inlier in response to the second feature point being matched with the initial homography matrix of the plane between the every two adjacent video frames, repeat the above steps from the extracting a preset number of feature points from the multiple same feature points as first feature points until a number of iterations reaches a preset number, and determine a target iteration with a maximum number of inliers among the iterations; and a final matrix determination unit configured to determine the homography matrix of the plane between the two adjacent video frames according to position information of all inliers determined in the target iteration in the two adjacent video frames.

* * * * *